(12) United States Patent
Bakshi et al.

(10) Patent No.: US 11,140,512 B1
(45) Date of Patent: Oct. 5, 2021

(54) SYSTEM FOR LOCATION-BASED DETERMINATIONS USING COMMON REGIONS

(71) Applicant: AMAZON TECHNOLOGIES, INC., Seattle, WA (US)

(72) Inventors: Hrishikesh Sunil Bakshi, Toronto (CA); Mark D. Riggins, Seattle, WA (US); Prashanth Basappa, Seattle, WA (US); Krishna Sai Dintyala, Bothell, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/103,284

(22) Filed: Nov. 24, 2020

(51) Int. Cl.
 *H04W 4/021* (2018.01)
 *G06Q 30/02* (2012.01)
 *G06Q 20/32* (2012.01)

(52) U.S. Cl.
 CPC ........ *H04W 4/021* (2013.01); *G06Q 20/3224* (2013.01); *G06Q 30/0261* (2013.01)

(58) Field of Classification Search
 CPC .......... G06Q 30/0635; G06Q 30/0641; G06Q 20/12; G06Q 30/0639; G06Q 10/083; G06Q 50/28; G06Q 30/0601; G06Q 30/0605; G06Q 20/203; H04W 4/029; G06F 16/535; G06F 16/538
 See application file for complete search history.

(56) References Cited

U.S. PATENT DOCUMENTS

| | | | | |
|---|---|---|---|---|
| 6,862,572 B1 * | 3/2005 | de Sylva | ............ | G06Q 30/0205 705/7.34 |
| 7,457,761 B2 * | 11/2008 | Smith | .................. | G06Q 10/025 705/317 |
| 7,593,871 B1 * | 9/2009 | Mesaros | ................ | G06Q 30/02 705/26.2 |
| 7,818,212 B1 * | 10/2010 | Mesaros | ............ | G06Q 30/0603 705/26.1 |

(Continued)

OTHER PUBLICATIONS

"Maidenhead Location System", Wikipedia, 4 pages. Retrieved from the Internet: URL: https://en.wikipedia.org/wiki/Maidenhead_Locator_System on Oct. 30, 2020.

(Continued)

*Primary Examiner* — Dung Hong
(74) *Attorney, Agent, or Firm* — Lindauer Law, PLLC

(57) ABSTRACT

Managing merchant coverage areas is complex. Different merchants may have different coverage areas, with some products only available in some regions, and so forth. When a user is searching for an available product, the user expects search results quickly. These search results may take into consideration which merchants offer which products at a user's physical location, or other location-dependent considerations. A system provides customizable region sets arranged in a hierarchy, where individual regions are indicative of a geographic area. The customized regions are usable by merchants to identify products or services available in different regions. The customized regions are also used to describe a user's physical location. The system may use the hierarchy of regions to quickly and efficiently determine which products or services are available to a user.

20 Claims, 6 Drawing Sheets

(56) References Cited

U.S. PATENT DOCUMENTS

| | | | | |
|---|---|---|---|---|
| 8,417,550 | B2* | 4/2013 | Gabrielson | G06Q 10/025 |
| | | | | 705/7.11 |
| 10,043,148 | B1* | 8/2018 | Chowdhary | G06Q 10/0838 |
| 10,321,263 | B1* | 6/2019 | AlKarmi | G06Q 30/0601 |
| 10,860,972 | B1* | 12/2020 | Rehn | G06Q 30/0641 |
| 10,977,751 | B1* | 4/2021 | Bernstein | G06Q 10/0832 |
| 2002/0007299 | A1* | 1/2002 | Florence | G06Q 10/0631 |
| | | | | 705/7.12 |
| 2015/0294262 | A1* | 10/2015 | Nelson | G06Q 10/083 |
| | | | | 705/330 |
| 2016/0042315 | A1* | 2/2016 | Field-Darragh | G06Q 30/0282 |
| | | | | 705/28 |
| 2016/0078516 | A1* | 3/2016 | Alnuwaysir | G06Q 30/0625 |
| | | | | 705/26.62 |
| 2018/0276580 | A1* | 9/2018 | Gurevich | G06F 16/24578 |
| 2020/0065403 | A1* | 2/2020 | Kohan | G06F 9/30029 |
| 2020/0219055 | A1* | 7/2020 | Nagar | G06Q 30/0283 |

OTHER PUBLICATIONS

"Set theory", Wikipedia, 8 pages. Retrieved from the Internet: URL: https://en.wikipedia.org/wiki/Set_theory on Oct. 30, 2020.

* cited by examiner

SYSTEM FOR LOCATION-BASED DETERMINATIONS USING COMMON REGIONS

BACKGROUND

Online stores where suppliers may provide goods or services to users require large amounts of computational resources to manage different merchant coverage areas as the number of merchants and users grows. For example, if an online store provides goods from multiple suppliers, it may take a large amount of computational time to determine which goods from which suppliers are available to a location from where a user is shopping.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
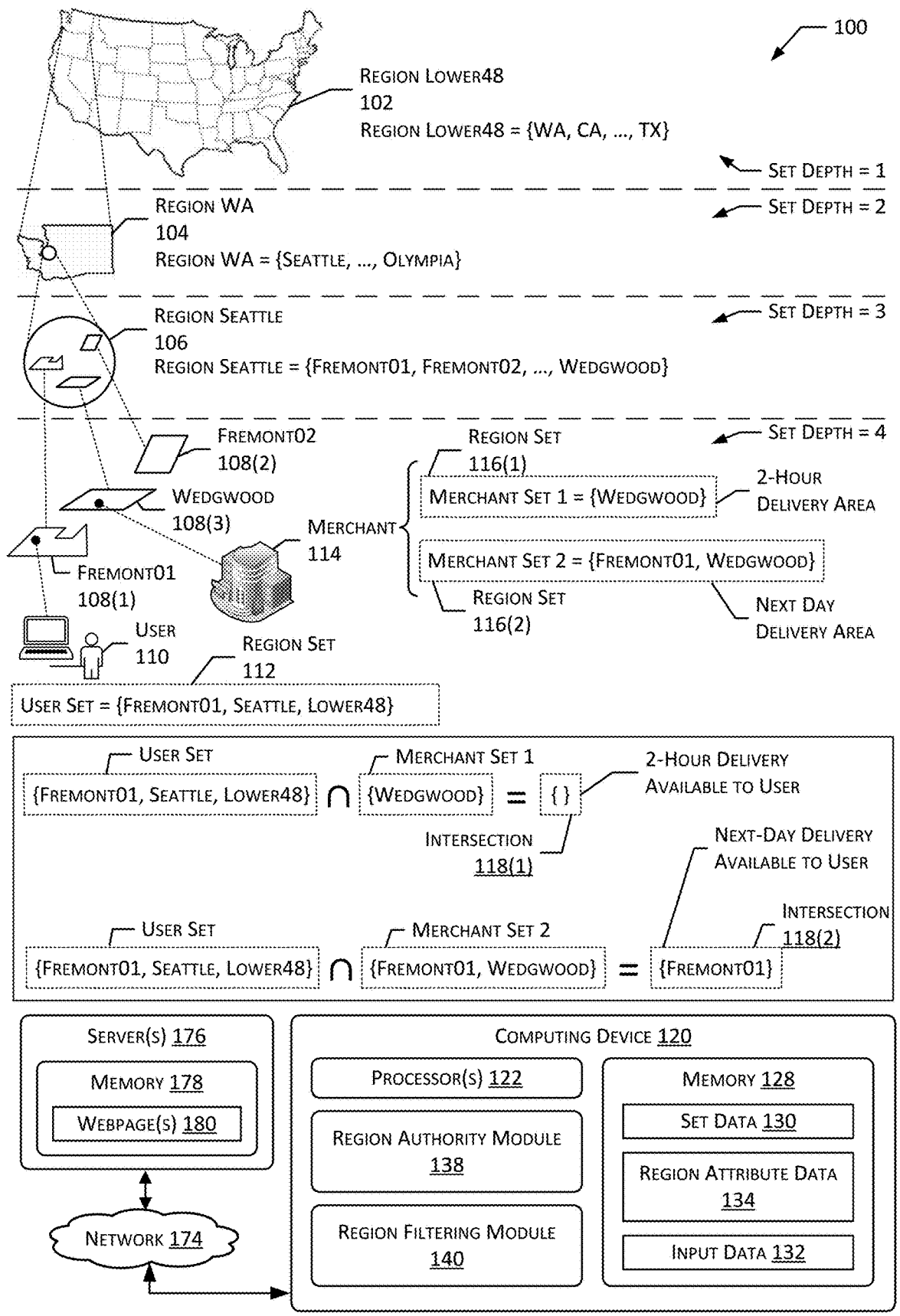
FIG. 1 illustrates a system for location-based determinations using common regions, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

Many items such as goods, services, content, and so forth are associated with particular geographic areas. For example, a restaurant may deliver to a local neighborhood, items sold by a merchant may only be available for delivery within a particular state, a particular courier company may only provide service within a certain area, digital content may be limited to distribution within a particular country, and so forth. These and other factors introduce significant complexity in determining what goods or services are available to particular users for delivery. When a user is searching for an available product, the user expects search results quickly. However, determining which merchants offer which products at a user's physical location can take substantial time and computational resources, resulting in delays to present this information. These delays can result in a poor customer experience, a decrease in sales, or other adverse effects.

Traditionally, postal codes have been used to specify geographic areas associated with a merchant. However, postal codes are cumbersome to use. For example, a single postal code may be larger than a merchant's coverage area, resulting in incorrect determinations as to whether the merchant is able to service the user. In another example, a merchant may have a coverage area that includes hundreds or thousands of postal codes.

Described in this disclosure is a module system that acts as a region authority to facilitate definition and use of regions with various levels of granularity to facilitate location-aware services such as product availability, delivery, and so forth. The region authority may provide a common framework for merchants, users, businesses, suppliers, or online store computer system providers to perform location-based determinations or other operations using a common definition of regions. Location-based determinations may be provided in response to a user allowing access to a user account that includes location information or allowing access to other information from which an online computer system may determine a location associated with the user. In some examples, a user may create an account and specify location information, or the user may otherwise provide location information. Location-based determinations may be used to determine goods, services, or products available to different users at different physical locations. Different combinations of goods, services, or products may be available from different merchants on a single online store. Goods, services, or products may include one or more of: physical products, digital content, services, shipping options, legal requirements, tax impositions, data collection policies, or other merchant-specified policies for interacting with users in a region.

A region authority service facilitates the definition and use of sets of customizable regions. Each defined region may be indicative of an individual geographic area of the physical world. In some implementations, an individual region may be indicative of multiple, disjoint or non-contiguous geographic areas, where individual geographic areas of the multiple, disjoint or non-contiguous geographic areas are selected based on a semantic classification.

Individual region sets may be associated with geographic areas at a same level of classification. For example, a first level of classification may be Earth, and a first set associated with the first level may include one region, indicative of the entire geographic area of the Earth. A second level of classification may be countries, and a second set associated with the second level may include 195 regions (as of this writing per the U.S. Department of State), with one region per country. In this example, the second region set is a subset of the first region set.

Continuing with this example, for each region of the second region set, there may be a next level of classification. In this example, the second region set may include a first region indicative of the United States of America (USA) and a second region indicative of Canada. The first region and the second region are members of the second region set, and regions at a same level of classification are indicative of geographic areas that are disjoint or non-adjacent from each other. Consequently, in the second region set, the first region indicative of the geographic area of the USA does not overlap geographically with the second region indicative of the geographic area of Canada.

In this example, regions included in sets associated at a lower level of classification are included within, or subsets of, sets associated with a higher level of classification. For example, each of the regions in the second region set at a second level of classification are included in the first region set at the first level of classification. Consequently, in the second region set, the first region indicative of the geographic area of the USA is included in the first region set indicative of the geographic area of the Earth. Similarly, for each level of classification, a region set at a given level of classification is a subset of a region set at a higher level of classification, where this relationship between region sets at different levels of classification may be described as a cumulative hierarchy in set theory.

In another example, given the first region set that includes a region indicative of Earth, other levels of classification may be customized. For example, instead of countries as a second level of classification, the second level of classification may be based on groups of countries organized according to different treaties. In other examples, a level of classification may be based on financial markets, or other types of geographic, historical, economic, or custom-specified classifications. Each level of classification may be customizable, and each region within each level of classification may also be customizable.

The customized regions in each region set are usable by merchants to identify products available in different geographic areas. The customized regions are also used to describe a user's physical location, or the physical location associated with a user account, such as a physical location associated with a street address or geographic coordinates. Compared to traditional systems, computational demands are reduced by using the cumulative hierarchy of region sets to perform location-based determinations to determine which products are available to a user. One reason that computation demands are lower is that merchant coverage areas may fully specify coverage regions with, in most cases, a small number of regions. Similarly, user locations may also be represented using a small number of regions. Given small region sets for users and merchants, determining whether a user is within a coverage area for a merchant may involve a small number of set operations. This reduces latency, reducing the time to provide information to a user and improving the user experience.

By using the disclosed region authority service, merchants may reduce computational loads on merchant systems or online store computer systems in generating content to present to a user based on a user location. For example, there may be multiple merchants that are each associated with an individual coverage area for providing goods or services. The coverage areas may be indicative of different geographic areas. To present the goods and services from the multiple merchants to a user, an online store computer system determines product and shipping options by calculating whether or not a physical location associated with a user is in the geographic region associated with each of the coverage areas. When there are multiple merchants, then the computational load on the online store computer system increases, which increases latency in providing a customer with information relevant to a physical location. By using a common model for specifying regions to perform location-based determinations, an online store computer system may use a first region associated with a user and compare against a region set associated with a merchant. Because the regions are commonly specified, if multiple merchants are associated with region sets that include the first region, then the question of whether a coverage area includes a physical location associated with a user may be determined without further calculation.

The location-based determinations by the region authority service may include improved security and privacy. For example, a merchant system or online store computer system may avoid storing personal information associated with a user, such as a specific physical location. In such an example, if a user visits a webpage associated with a merchant, the merchant may temporarily use inferred physical location information to request a region set from the region authority. Given the region set for the user, the merchant system may remove references to the physical location because the region set for the user provides the merchant system with information to provide a location-based customer experience. The location-based customer experience may include a customized webpage that includes accurate shipping options and available goods or services within a geographic area indicated by the region set.

The region authority service may also provide location-based determinations that include a simplified configuration process for onboarding merchants. For example, instead of a merchant entering long and complex lists of postal codes, a merchant may use a user interface provided by the region authority to select one or more coverage areas based on regions indicative of geographic areas that are helpful to the merchant. For example, a geographic area indicated by an available region may be based on whether ground transportation within the geographic area may provide for delivery services under a threshold amount of time. For example, a region may indicate a geographic area based on whether delivery of a good or service from within the geographic region may be done in under an hour or some other threshold amount of time that corresponds to services provided by the merchant. As discussed above, the non-customizable granularity of some postal codes may prevent merchants from servicing some users.

By using the techniques described in this disclosure, a region authority service provides customizable regions for specifying goods, services, or delivery options for multiple different merchants. The customizable regions may be designed to provide a level of granularity for specifying geographic areas that closely align with a practical or economically feasible coverage area for a given merchant. The region authority and region filtering module may also improve the responsiveness of systems that interact with users by more efficiently filtering out regions and associated items or shipping options that do not apply to a user at a given physical location.

Illustrative System

FIG. 1 illustrates a system 100 for location-based determinations using common regions, according to some implementations.

The region authority module 138 and the region filtering module 140 use regions to represent physical locations and geographic areas. Regions and region sets may be used for efficient location-based determinations to determine merchant offers and services relating to individual regions and to determine information associated with an individual region. Individual regions may be associated with physical location information for a user account for a user attempting to access items or services provided by a merchant. Location-based determinations may be a basis for providing a user 110 with offers for goods and services from a merchant based on a physical location associated with the user 110. In some examples, the region authority module 138 may provide location-based determination services to a web hosting computer system for an individual merchant, such as merchant 114.

In other examples, the region authority module 138 may provide location-based determinations to online store computer systems that provide responsive user interfaces for users searching for goods or services from one or more merchants. The online store computer system may provide responsive user interfaces even when the combination of merchants and associated coverage areas, shipping options, restrictions, or policies results in millions or billions of records of information.

The region authority module 138 and the region filtering module 140 may be implemented on a computing device 120 serving as a region authority, where region authority services may be provided by the region authority module 138. The computing device 120 includes a processor(s) 122 and memory 128 storing set data 130, region attribute data 134, and input data 132. The computing device 120 may be connected to a network 174 that allows communication with servers 176.

The region authority module 138 may store user account data, which may include user login information, user passwords, a user address, and payment information. Account data may include an indication of a user acceptance of terms or conditions, including permission to store user account information, such as a physical delivery address or other location information. Account data may include an indication that a user 110 has opted-in to allow cookies stored on a user computer system.

A region authority may be a service that provides a common source for definitions of regions and region sets and may provide services associated with the regions and region sets. A region authority may provide services using an application programming interface (API) for merchants or for online store computer systems to perform location-based determination operations provided by the region filtering module 140.

A region authority may provide merchants with services that include providing a region set that is associated with a coverage area provided by a merchant. An individual merchant may offer different types of products or services based on different contexts. For example, a first context may be products or services that are available for a 2-hour delivery within a first geographic area. A second context may be products or services that are available for next-day delivery within a second geographic area. Variations of context may include in-store products or prices, 2-day delivery service, or any other product or service that depends on a geographic area. Each variation on types of products or services available depending on a geographic area may be represented by a corresponding region set.

For example, a merchant may request a first region set from the region authority that includes the first geographic area. The region authority may determine the first region set to include one or more regions that include the first geographic area and return a first region set identifier to the merchant. The region set identifier may be used by the merchant to reference the first region set. For example, the merchant may provide the region authority with the region set identifier to specify products or services that are available for a 2-hour delivery. The region authority may index the first region set using the region set identifier and associate the specified products or services with each of the regions in the first region set. Similarly, the merchant may, for a second context, specify a second region set and associated attributes.

The region authority may also provide storage of a region set for a merchant, where the region set for the merchant may be indexable by a merchant identifier or by a region set identifier returned to the merchant in response to creating a region set. The region authority may also store, for individual regions in a given merchant region set, associated attributes, such as one or more of: access control, available products, available shipping options, tax information, legal restrictions, or boundaries that are included or excluded. The region authority may also provide online store computer systems that interact with a user with services such as providing a region set indicative of a geographic area that includes a physical location or delivery address associated with a user account.

The region filtering module 140 may be implemented on a computing device 120. The computing device 120 may be a server accessible over a network 174 to servers 176 associated with merchant computer systems, online store computer systems such as those providing an online store, or to computer systems associated with municipalities or other governmental entities. In some examples, the region authority module 138, the region filtering module 140, and associated region authority services may be implemented within a cloud computing environment (not depicted).

The region authority may store region information as set data 130 in the memory 128. The set data 130 may include specifications for all regions available as part of the services provided by the region authority. Set data 130 may store the regions organized in accordance with region sets, where the region sets are specified in accordance with a cumulative hierarchy, as described above.

The region authority may store information associated with a given region set as region attribute data 134. The region attribute data 134 may include the attributes described above, including one or more of: access control, available products, available shipping options, tax information, legal restrictions, or boundaries that are included or excluded. The region attribute data 134 may be indexed or associated with a region set identifier, where a region set identifier is provided by the region authority to a merchant or online store computer system in response to creation of a region set.

In this example, a merchant 114 may be associated with the server(s) 176, which includes memory 178 and webpage(s) 180. The merchant 114 may be, for example, a grocer that provides delivery services within a coverage area. The merchant 114 may provide webpages 180 that describe items available for purchase, delivery options, or legal restrictions. Legal restrictions may include age verification requirements for purchasing alcohol or days of the week or windows of time during which alcohol sales are restricted.

In some examples, a merchant 114 server(s) 176 may precompute some options prior to a webpage request from a computer system associated with a user 110. The server(s) 176 may determine, prior to the webpage request, options such as product availability, service availability, or shipping options or schedules. These options may be determined for every region of every region set in one or more coverage areas of a merchant 114. Based on the options being available before a visit from a user 110 associated with a particular region, a customized, location-aware version of information in a webpage provided to the computer system associated with the user 110 may be provided responsively and quickly. For example, a server 176 may use a region set identifier for the merchant 114 to request from the region authority a region set that includes a first region, a second region, and a third region. The server 176 may request attributes associated with the region set from the region authority. The attributes may specify first options regarding products or services for individual regions in the region set, including all of the regions.

In this example, a computer system associated with the user 110 requests the webpage 180 provided by the server 176. The user 110 may be associated with the second region, and the server 176 may generate a customized, location-aware webpage 180 based on precomputed second options associated with the second region. A similar process may be performed for other users that may be associated with the first region and the third region. Because the options are associated with individual regions of a region set in the merchant 114 coverage area, including all regions, and not per individual user 110, the quantity of precomputed options is at most the number of regions within the merchant 114 coverage area. In this way, by precomputing options, any number of users may be provided with location-aware webpages 180 without determining options based on a location determined for an individual user after the user 110 requests a webpage 180 from the merchant 114.

In this example, the region authority may store multiple region sets, where different region sets that are associated with different levels of classification may be at a different set depth. The set depth may be associated with a hierarchical level of a graph that represents the regions, where a root of the hierarchy may be associated with a set depth of 1. In this example, a set depth of 1 is associated with the first level of classification, a set depth of 2 is associated with a second level of classification, a set depth of 3 is associated with a third level of classification, and a set depth of 4 is associated with a fourth level of classification.

The region sets include region Lower48 102. Region Lower48 102 may be a region set that includes regions indicative of geographic areas associated with each state, including region WA 104. Region WA 104 may be a region set that includes regions indicative of geographic areas of each city in the state of Washington, including region Seattle 106. Region Seattle 106 may include regions indicative of geographic areas that are customized to include parts of or span across neighborhoods, including region Fremont01 108(1), region Fremont02 108(2), and region Wedgwood 108(3).

In some examples, a region, such as region Fremont01 108(1) may be customized based on coverage areas for one or more merchants. For example, a region may be indicative of a geographic area with a shape based on providing a delivery time for a product under a threshold amount of time for a merchant delivery service. Such a region may have an irregular shape because delivery time may be dependent upon types of roads, quantities of roads, or other infrastructure or topological characteristics of the geographic area.

In other examples, an individual region may be indicative of a geographic area that includes a multistory building. In this example, the individual region may be indicative of areas at elevations above a ground level geographic area. For example, each floor of the multistory building may be an individual area, where each individual area is at a different elevation. In this example, the individual region may be one or more of: solely a geographic area associated with a ground floor, all areas associated with each floor of the multistory building, or a subset of areas associated with a subset of floors of the multistory building.

In this example, a user 110 may be associated with a user account with a delivery address within region Fremont01 108(1). The merchant 114 may be associated with a merchant account with a business address within region Wedgwood 108(3). In this example, a user 110 may use a web browser to navigate to a website offering goods and services by the merchant 114. In providing a webpage 180 to the web browser, the servers 176 hosting the website may collect information from which a user's account information may be accessed, or from which a user's physical location may be inferred.

Servers 176 may use the account information to determine one or more delivery addresses associated with the user account. Servers 176 may provide the one or more delivery addresses to the region authority to request a region set 112 associated with the one or more delivery addresses. In this example, the region set 112 associated with the one or more delivery addresses and the user 110 is region set={Fremont01, Seattle, Lower48}. Region Fremont01 108 (1) is a region indicative of a geographic area that includes a physical location. Regions Seattle 106 and Lower48 102 are included in the region set because any good or service that is offered by a merchant within region Seattle 106 would also include region Fremont01 108(1). Region Seattle 106 includes region Fremont01 108(1) because each given region at each level includes all regions at lower levels, and region Fremont01 108(1) is at a lower level than region Seattle 106. Similarly, region Lower48 102 is included in the region set for the user 110 because any merchant that offers goods or services to region Lower48 102 would include region Fremont01 108(1).

The region authority may specify a region set associated with delivery of goods or services to include all regions in all levels above the region associated with a delivery address or delivery physical location. A first region is at a level above a second region based on the first region being associated with a geographic area or areas that include the geographic area or areas associated with a second region.

The region authority may specify a region set associated with a provider of goods or services to include one or more regions that includes all specified geographic areas of coverage by the provider for providing goods or services, but that does not include regions associated with geographic areas where there is no coverage by the provider for providing goods or services. In this example, the merchant sets associated with the merchant 114, depicted as region sets 116 in FIG. 1, include regions Wedgwood 108(3) and Fremont01 108(1). However, region sets 116 do not include other depicted regions because in this example, the merchant 114 does not provide goods or services in other regions beyond those included in region sets 116.

Servers 176 may store a cached version of one or more region sets 116 associated with the merchant 114 and use the cached one or more region sets 116 to perform a location-based determination using the region set 112 associated with the user 110. In other examples, the servers 176 may request a region set from the region authority. In this example, in either case, the region sets 116 associated with the merchant 114 are region sets 116(1, 2). Region sets 116(1, 2) indicate merchant set 1={Wedgwood} and merchant set 2={Fremont01, Wedgwood}. Region Fremont01 108(1) and Region Wedgwood 108(3) are regions indicative of geographic areas that include different coverage areas for delivery services.

In this example, region set 116(1), or merchant set 1, is associated with a 2-hour delivery service, and products or services provided by the merchant that are associated with this region set 116(1) are available for delivery within geographic areas associated with all regions in the region set 116(1). Similarly, region set 116(2), or merchant set 2, is associated with a next-day delivery service, and products or services provided by the merchant that are associated with this region set 116(2) are available within geographic areas associated with all regions in the region set 116(2). In the interest of clarity, two region sets are depicted in FIG. 1. However, more generally, a single merchant may create and be associated with any number of regions sets 116 corresponding to different types of products, services, restrictions, promotions, delivery schedules, or other types of conditions associated with goods or services provided by a merchant 114.

Continuing with this example, servers 176 have a region set 112 associated with a delivery address or location for the user 110 and region sets 116 associated with different types of coverage for goods or services by the merchant 114. To determine which goods or services provided by the merchant 114 are available to the user 110, an intersection 118 of the region set 112 and the region sets 116 is performed. The intersection 118(1) of the region set 116(1), or merchant set 1, for the merchant 114 and the region set 112 for the user 110 results in one or more regions that are included in both region sets 116(1), 112. Similarly, the intersection 118(2) of the region set 116(2), or merchant set 2, for the merchant 114 and the region set 112 for the user 110 results in one or more regions that are included in both region sets 116(2), 112. In this example, there are no regions that are included in both region set 116(1) and region set 112. Consequently, there are no 2-hour delivery services provided by the merchant 114 to the delivery address associated with the user 110. Continuing this example, the one or more regions that are included in both region set 116(2) and region set 112 is region Fremont01 108(1). Region Fremont01 108(1) being in both region sets 116(2), 112 is indicative of a geographic area that includes the delivery address associated with the user 110 and that also includes a coverage area for next-day delivery services from the merchant 114.

Figure 2:
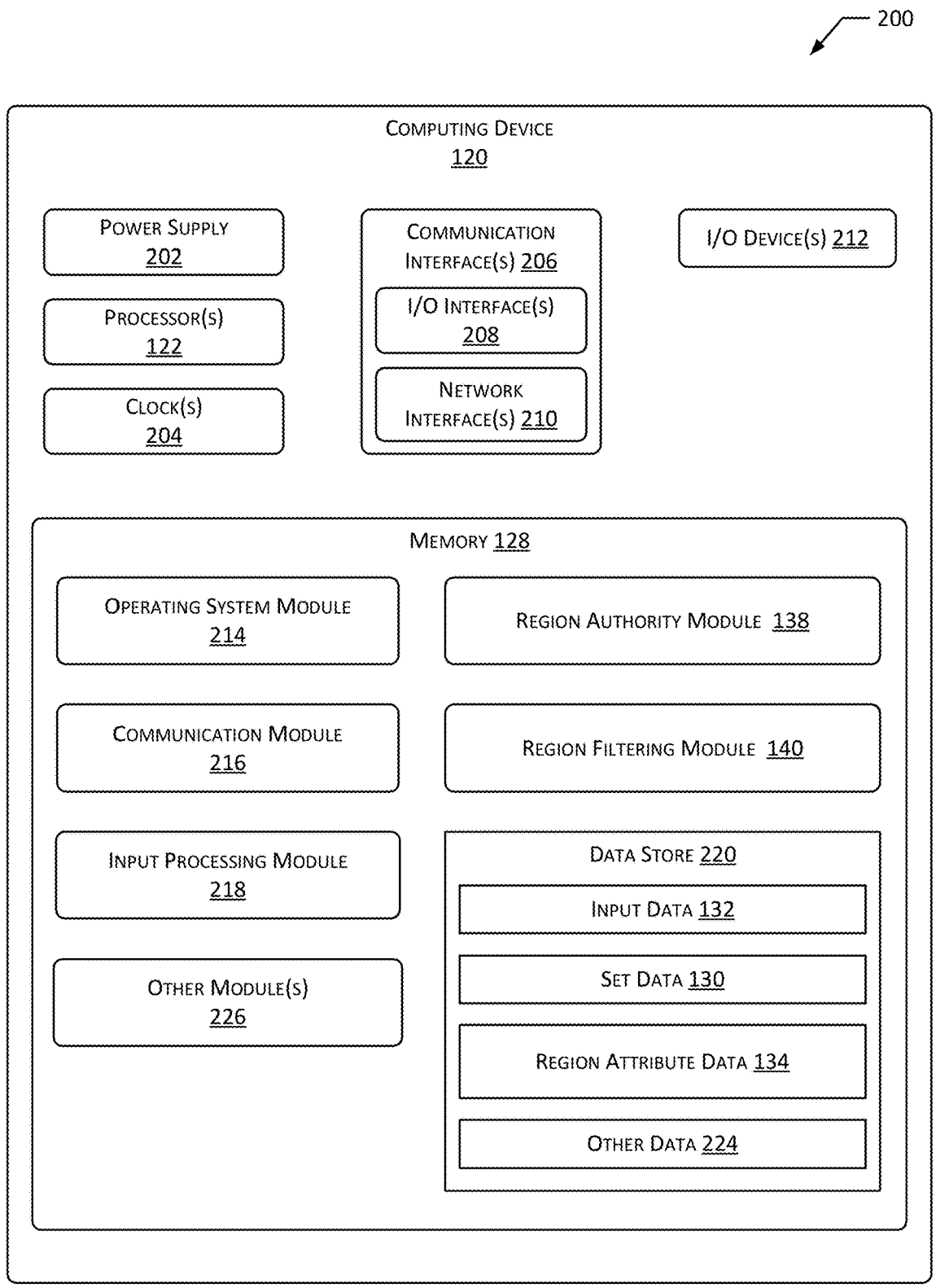
FIG. 2 is a block diagram illustrating a computing device implementing a region authority module, according to some implementations.

FIG. 2 is a block diagram 200 illustrating a computing device 120 implementing a region authority module 138, according to some implementations.

One or more power supplies 202 may be configured to provide electrical power suitable for operating the components of the computing device 120. In some implementations, the power supply 202 may include a rechargeable battery, fuel cell, photovoltaic cell, power conditioning circuitry, and so forth.

The computing device 120 may include one or more hardware processor(s) 122 (processors) configured to execute one or more stored instructions. The processor(s) 122 may include one or more cores. One or more clock(s) 204 may provide information indicative of date, time, ticks, and so forth. For example, the processor(s) 122 may use data from the clock 204 to generate a timestamp, trigger a preprogrammed action, and so forth.

The computing device 120 may include one or more communication interfaces 206, such as input/output (I/O) interfaces 208, network interfaces 210, and so forth. The communication interfaces 206 may enable the computing device 120, or components of the computing device 120, to communicate with other computing devices 120 or components of the other computing devices 120. The I/O interfaces 208 may include interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 208 may couple to one or more I/O devices 212. The I/O devices 212 may include any manner of input devices or output devices associated with the computing device 120. For example, I/O devices 212 may include touch sensors, displays, touch sensors integrated with displays (e.g., touchscreen displays), keyboards, mouse devices, microphones, image sensors, cameras, scanners, speakers or other types of audio output devices, haptic devices, printers, and so forth. In some implementations, the I/O devices 212 may be physically incorporated with the computing device 120. In other implementations, the I/O devices 212 may be externally placed.

The network interfaces 210 may be configured to provide communications between the computing device 120 and other devices, such as the I/O devices 212, routers, access points, and so forth. The network interfaces 210 may include devices configured to couple to one or more networks 174 including local area networks (LANs), wireless LANs (WLANs), wide area networks (WANs), wireless WANs, and so forth. For example, the network interfaces 210 may include devices compatible with Ethernet, Wi-Fi, Bluetooth, ZigBee, Z-Wave, 3G, 4G, 5G, LTE, and so forth.

The computing device 120 may include one or more buses or other internal communications hardware or software that allows for the transfer of data between the various modules and components of the computing device 120.

As shown in FIG. 2, the computing device 120 may include one or more memories 128. The memory 128 may include one or more computer-readable storage media (CRSM). The CRSM may be any one or more of an electronic storage medium, a magnetic storage medium, an optical storage medium, a quantum storage medium, a mechanical computer storage medium, and so forth. The memory 128 may provide storage of computer-readable instructions, data structures, program modules, and other data for the operation of the computing device 120. A few example modules are shown stored in the memory 128, although the same functionality may alternatively be implemented in hardware, firmware, or as a system on a chip (SoC).

The memory 128 may include one or more operating system (OS) modules 214. The OS module 214 may be configured to manage hardware resource devices such as the I/O interfaces 208, the network interfaces 210, the I/O devices 212, and to provide various services to applications or modules executing on the processors 122. The OS module 214 may implement a variant of the FreeBSD operating system as promulgated by the FreeBSD Project; UNIX or a UNIX-like operating system; a variation of the Linux operating system as promulgated by Linus Torvalds; the Windows operating system from Microsoft Corporation of Redmond, Wash., USA; or other operating systems.

One or more data stores 220 and one or more of the following modules may also be associated with the memory 128. The modules may be executed as foreground applications, background tasks, daemons, and so forth. The data store(s) 220 may use a flat file, database, linked list, tree, executable code, script, or other data structure to store information. In some implementations, the data store(s) 220 or a portion of the data store(s) 220 may be distributed across one or more other devices including other computing devices 120, network attached storage devices, and so forth.

A communication module 216 may be configured to establish communications with one or more other computing devices 120. Communications may be authenticated, encrypted, and so forth.

The memory 128 may also store an input processing module 218. The input processing module 218 may receive data indicative of user input. The input processing module 218 may determine one or more functions, commands, or data associated with the user input and may cause the performance of one or more operations in response to the user input. For example, the input processing module 218 may access input data 132 that associates particular commands, functions, or additional data that may be accessed in response to particular types of user input.

Other modules 226 may also be present in the memory 128. For example, other modules 226 may include permission or authorization modules to enable a user to provide authorization to send and receive data associated with the computing device 120. Other modules 226 may also include encryption modules to encrypt and decrypt communications between computing devices 120, authentication modules to authenticate communications sent or received by computing devices 120, a permission module to assign, determine, and manage user permissions to access or modify data associated with computing devices 120, and so forth. Other modules 226 may include modules for presenting interfaces, modifying presentation of interfaces based on user configurations or preferences, and so forth.

Other data 224 within the data store(s) 220 may include configurations, settings, preferences, and default values associated with computing devices 120. Other data 224 may also include encryption keys and schema, access credentials, and so forth.

In different implementations, different computing devices 120 may have different capabilities or capacities. For example, servers 176 may have greater processing capabilities or data storage capacity than user devices.

Figure 3:
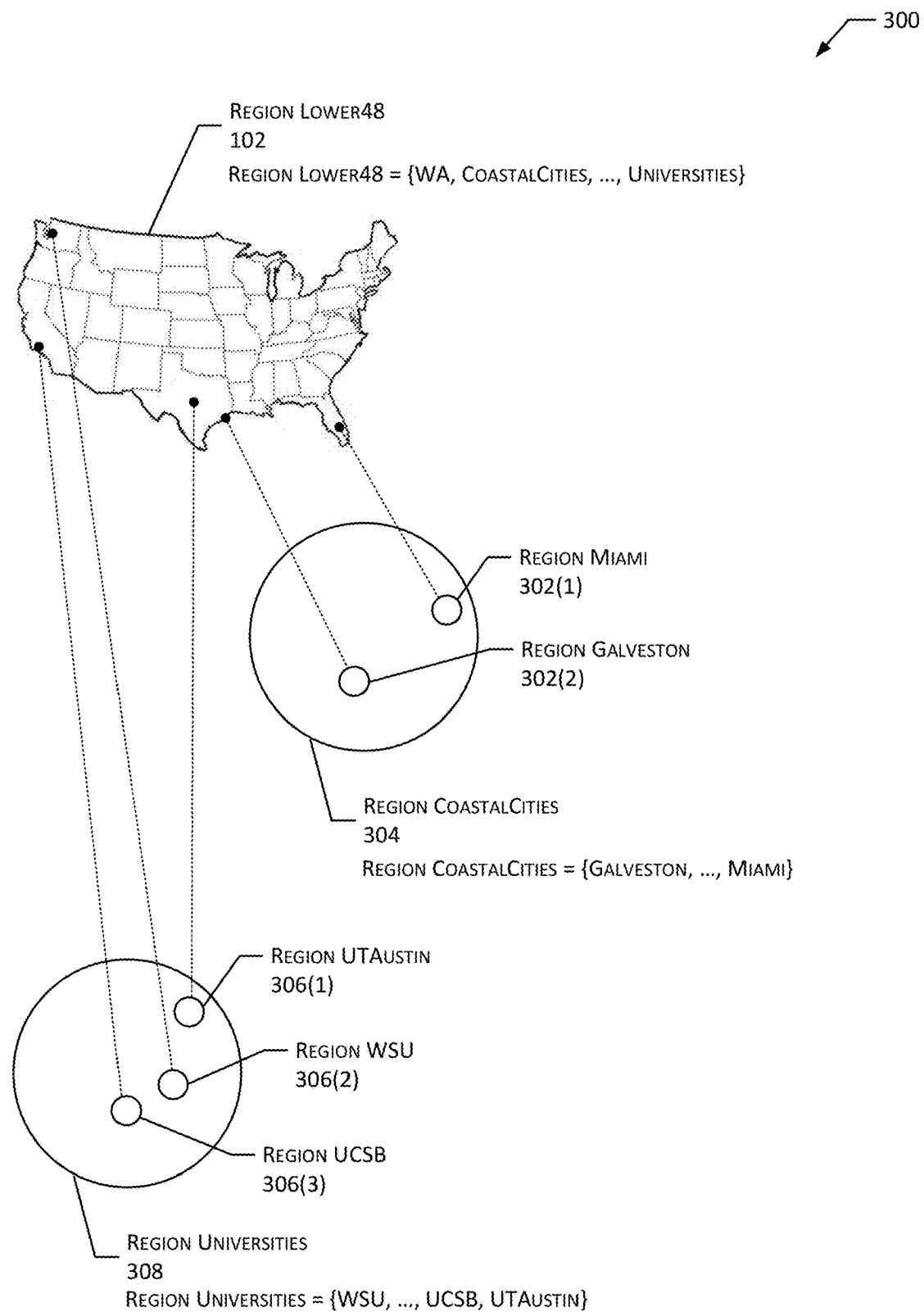
FIG. 3 illustrates regions indicative of geographic areas based on a semantic specification, according to some implementations.

FIG. 3 illustrates at 300, regions indicative of geographic areas based on a semantic specification, according to some implementations.

In some examples, regions may be indicative of contiguous geographic areas that are adjacent to one another, such as a geographic area bounded by a polygon, or other geometric shape. A region may also be indictive of geographic areas specified according to a geopolitical boundary, without reference to geographic coordinates. For example, a region may indicate an individual country, or state, or other bounded geographic area, without specifying a shape or extent of the geographic area associated with the country, state, or other bounded geographic area. A region may also indicate information for identifying a delivery location, including mobile delivery locations, such as a specifically identified cruise ship in a harbor in Los Angeles, Calif.

In other examples, an individual region may be indicative of a collection of geographic areas, such as a collection of geographic areas associated with states along the west coast of the USA and also geographic areas associated with states along the east coast of the USA. Region sets at different levels of classification may be nested sets. For example, the region Lower48 102 is a region set that includes a chain of subsets of regions, where each subset in the chain of subsets includes all regions in each following subset.

In some examples, individual region sets may be associated with geographic areas at a level of classification. For example, a first level of classification may be Earth, and a first region set associated with the first level may include one region, indicative of the entire geographic area of the Earth. A second level of classification may be countries, and a second region set associated with the second level may include 195 regions (as of this writing per the U.S. Department of State), with one region per country. In this example, the second region set is a subset of the first region set.

In some examples, individual regions in a region set at a given level of classification may include different numbers of additional levels of classification. For example, the first region set includes a single region indicative of a geographic area of the Earth. At a second example level of classification, a second region set may include continents, where a first region is indicative of a geographic area associated with Antarctica. In this example, there may be no additional levels of classification after the level of classification associated with the first region. However, for other regions associated with other continents, there may be additional levels of classifications. For example, levels of classifications associated with countries, states, territories, disputed geographic areas, or cities may be included.

In this example, continuing from the above first region set indicative of the Earth, for each region of the second region set, there may be a next level of classification. The second region set may include a first region indicative of the lower 48 states of the United States of America (USA) and a second region indicative of Canada. The first region and the second region are members of the second region set, and regions at a same level of classification are indicative of geographic areas that are disjoint from each other. Consequently, in the second region set, the first region indicative of the geographic area of the USA does not overlap geographically with the second region indicative of the geographic area of Canada.

In this example, regions included in sets associated at a lower level of classification are included within, or subsets of, sets associated with a higher level of classification. For example, each of the regions in the second region set at a second level of classification are included in the first region set at the first level of classification. Consequently, in the second region set, the first region indicative of the geographic area of the USA is included in the first region set indicative of the geographic area of the Earth. Similarly, for each level of classification, a region set at a given level of classification is a subset of a region set at a higher level of classification, where this relationship between region sets at different levels of classification may be described as a cumulative hierarchy in set theory.

In another example, given the first region set that includes a region indicative of Earth, other levels of classification may be customized. For example, instead of countries as a second level of classification, the second level of classification may be based on groups of countries organized according to different treaties. In other examples, a level of classification may be based on financial markets, or other types of geographic, historical, economic, or custom-specified classifications. Each level of classification may be customizable, and each region within each level of classification may also be customizable.

As discussed above, an individual region may be indicative of multiple, disjoint geographic areas, where individual geographic areas of the multiple, disjoint geographic areas are selected based on a semantic specification. A semantic specification may be indicative of some characteristic of a geographic area or of some characteristic of a structure, business, or an attribute of one or more features found within the geographic area. For example, a characteristic or attribute may specify one or more of: a type of academic institution, a type of terrain, a type of retail establishment, a type of municipality, a feature of a neighborhood, a population size, a governmental organization, or a type of climate.

In this example, region Lower48 102, in addition to the states described above with respect to FIG. 1, includes regions based on a semantic specification, region CoastalCities 304 and region Universities 308.

In this example, an individual region, region Universities 308, may be based on a semantic specification that specifies presence of a university or other institute of higher education in the USA that has more than 20,000 students enrolled. Based on this semantic specification, an individual region may be indicative of a plurality of geographic areas, where each geographic area in the plurality of geographic areas includes a university campus, where the geographic area is included, directly or indirectly, within a region indicative of the USA, and where the university has more than 20,000 students enrolled.

For simplicity, while many universities meet this semantic specification, in this example, region Universities 308 is a region that is specified by a region set that includes only three individual regions indicative of geographic areas for three universities. The regions in region Universities 308 include region UTAustin 306(1), region WSU 306(2), and region UCSB 306(3). Region UTAustin 306(1) is indicative of a geographic area that includes the University of Texas at Austin, region WSU 306(2) is indicative of a geographic area that includes Washington State University, and region UCSB 306(3) is indicative of a geographic area that includes the University of California, Santa Barbara.

This individual region associated with the plurality of geographic areas may be used by the region authority when location-based determinations include filtering according to a region specified by the semantic specification. For example, one or more merchants 114 may offer services or products targeted to university students, and if the region authority provides a single region that is associated with a semantic classification of universities, then the single region simplifies the location-based determination operations for the one or more merchants 114 to reach university students.

As another example, an individual region, region CoastalCities 304, may be based on a semantic specification that specifies metropolitan areas, where the metropolitan areas may be additionally specified by a particular population size, geographic region, or climate. For example, metropolitan areas along a coast that has a population over 10,000 and an average yearly temperature above 70 degrees Fahrenheit.

For simplicity, while many coastal cities meet this semantic specification, in this example, region CoastalCities 304 is a region that is specified by a region set that includes only two individual regions indicative of geographic areas for two coastal metropolitan areas that have a population over 10,000 and a yearly average temperature above 70 degrees Fahrenheit. The regions in region CoastalCities 304 include region Miami 302(1) and region Galveston 302(2). Region Miami 302(1) is indicative of a geographic area that includes the city of Miami, Fla. Region Galveston 302(2) is indicative of a geographic area that includes the city of Galveston, Tex.

Figure 4:
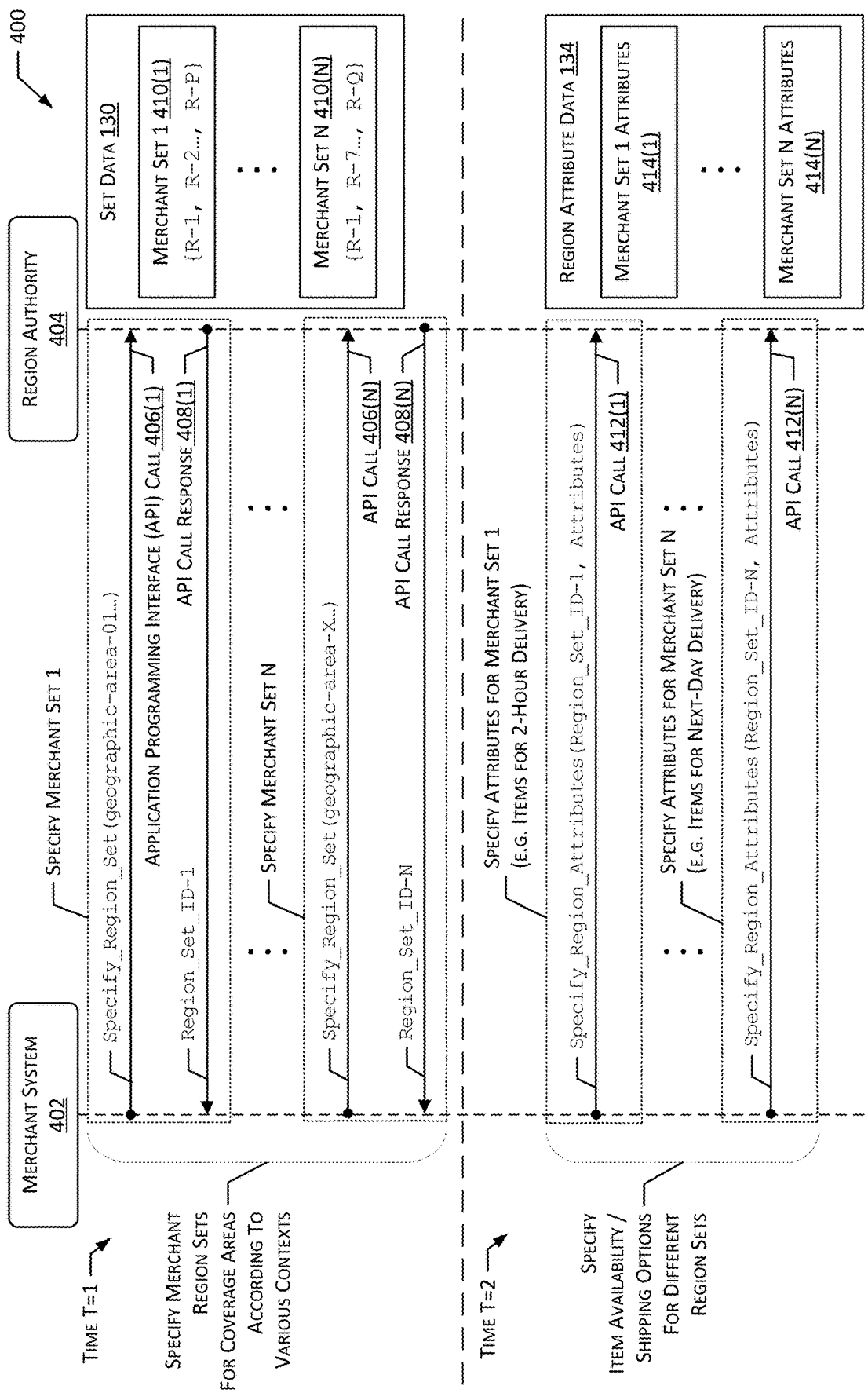
FIG. 4 illustrates workflow for a merchant using a region authority to configure a coverage area, according to some implementations.

FIG. 4 illustrates at 400, a workflow for a merchant 114 using a region authority to configure a coverage area, according to some implementations.

In this example, a merchant 114 may use a merchant system 402 to configure a first coverage area using a region authority 404 to determine a first one or more regions that include the first coverage area. The region authority 404 may respond to a request for a first region set that includes the first coverage area by determining the first one or more regions that are indicative of a first one or more geographic areas that include the first coverage area. The merchant 114 may also specify first attributes for products, services, or more generally, any item offered by the merchant 114 within individual regions of the first region set. The merchant 114 may also specify first attributes, to include shipping options or other delivery options associated with an item for individual regions of the first region set. The first attributes may be stored in association with a region set within region attribute data 134. In this example, the first coverage area may be associated with a 2-hour delivery area for the merchant 114, and so the regions within the first region set may be associated with a 2-hour delivery level of service.

Continuing this example, the merchant 114 may specify a second coverage area using the region authority 404 to determine a second one or more regions that include the second coverage area. The region authority 404 may respond to a request for a second region set that includes the second coverage area by determining the second one or more regions that are indicative of a second one or more geographic areas that include the second coverage area. The merchant 114 may specify second attributes that apply to the second one or more regions in the second region set. Similarly, as depicted in FIG. 4, the merchant 114 may continue to specify, for each type of coverage for different coverage areas, additional region sets. In this example, the merchant 114 specifies N region sets, merchant sets 1-N.

In this example, a merchant 114, using a merchant system 402, may use an interface provided by the region authority 404 to select one or more regions that are associated with one or more geographic areas specified by the merchant 114. For example, the region authority 404 may provide user interface elements with configuration options that correspond to application programming interface (API) calls. An example user interface element may be a depiction of a map with an option to select a geographic area depicted in the map that is associated with a given coverage area for the merchant 114.

As depicted in FIG. 4, at a first time, t=1, the merchant specifies multiple coverage areas according to various contexts, where each coverage area is associated with a respective region set. As described above with respect to FIG. 1, a context may be associated with a level of service, delivery schedules, or other attributes that may be specified by a merchant 114 for a given one or more geographic areas. Each selected geographic area, for each type of coverage area, may be associated with an API call 406(1-N) that provides the selected geographic area to the region authority 404. In this example, in the interest of simplicity, the API calls 406(1-N) are indicated as "Specify_Region_Set( )". The Specify_Region_Set( ) API call 406 may take as an argument a specified one or more geographic areas, as depicted in FIG. 4. The region authority 404, in response to receiving an API call 406, may determine a region set that is indicative of a geographic area that includes the geographic area specified in the API call 406. The Specify_Region_Set( ) API calls 406 may include more than one geographic area. As discussed above with respect to FIG. 1, the region authority 404 may select a smallest number of regions that are indicative of geographic areas that are included in the Specify_Region_Set( ) API calls 406.

In response to each Specify_Region_Set( ) API call 406, the region authority 404 may return, using an API call response 408(1-N), a region set identifier, depicted as Region_Set_ID-1-Region_Set_ID-N. Each region set identifier may be used by the merchant system 402 to reference a region set associated with the region set identifier. As depicted, there are N region sets, merchant set 1 410(1)-merchant set N 410(N), determined by the region authority 404 in response to each Specify_Region_Set( ) API call 406.

In this example, at a second time, t=2, a merchant 114, using the merchant system 402, may specify different attributes associated with different goods or services provided by the merchant 114 for different region sets. The merchant 114 may specify attributes for each of the N region sets using API calls 412(1-N). As depicted, two example attributes are associated with delivery times for different region sets. For example, for a first region set identifier, Region_Set_ID-1, the merchant system 402 may specify one or more items or services available for 2-hour delivery. The merchant system 402 may also specify one or more items or services available for next-day delivery. Similarly, for each different region set, associated with a respective region set identifier, the merchant may specify different offers, schedules, items, services, or prices, among other attributes listed above.

The merchant system 402 may specify, for each API call 412, a region set identifier, Region_Set_ID-1-Region_Set_ID-N, associated with a respective region. The merchant system 402 may also specify, for each API call 412, one or more attributes associated with the regions in the region set associated with the specified region set identifier. In this example, the merchant system 402 makes N "Specify_Region_Attributes( )" API calls 412(1-N) to specify attributes for individual region sets in the merchant's region sets, merchant sets 1-N. There are attributes stored by the region authority 404 in response to each of the N Specify_Region_Attributes( ) API calls 412(1-N), depicted as merchant set 1 attributes 414(1)-merchant set N attributes 414(N).

In other examples, because the attributes associated with different region sets are specific to the merchant 114, the merchant 114 may use a different technique for storing attributes associated with different regions. For example, a NoSQL database (not depicted) may be used by the merchant system 402 for efficiently storing attributes, such as scheduling information or other information associated with goods or services for a region. A NoSQL, or non-relational database may provide a key-value store that may efficiently store and retrieve records using, for example, an identifier such as a merchant identifier or a region set identifier. An example NoSQL database includes Amazon's DynamoDB. In some examples, other types of databases or data repositories may be used, including relational databases. In some examples, a benefit of using a database that is independent of the region authority is that the region authority may primarily provide management of regions and not expend computational resources on managing information associated with regions.

In some examples, a municipality may be considered a merchant 114 and a coverage area may specify regions of a region set that include a taxable jurisdiction. In this example, the municipality may specify attributes such as tax policies or tax rates that apply to types of goods or services that are bought or sold within a region set requested from the region authority 404. The region authority 404 may provide the region set responsive to the municipality using the API call 406(1) to specify a geographic area that includes the taxable jurisdiction. The municipality may specify attributes indicative of the tax policies or tax percentages that apply to types of goods or services using the API call 406(1) to specify attributes of the regions within the region set assigned to the municipality.

In some examples, a region set may be a minimal set that uses a lowest granularity region to include a geographic area, for example, geographic-area-01. A merchant 114 may select multiple geographic areas that are dispersed across multiple regions. For example, a region may be Seattle 106, as depicted in FIG. 1, where region Seattle 106 may be specified by regions of a region set that, if combined, include all geographic areas of region Seattle 106.

In this example, if the merchant selects all geographic areas in Seattle, then the region set returned to the merchant system 402 includes the individual region, region Seattle 106, and not a region set that includes all the higher-granularity regions, such as neighborhoods, that in combination indicate the entire geographic area of Seattle. In this example, region Seattle 106 is a lowest-granularity region, or largest region, to include all the specified geographic areas by the merchant 114 in selecting a coverage area. By using a minimal number of regions in specifying a region set, computational performance may be improved because fewer regions are used to perform location-based determinations.

In this example, region Seattle 106 may be the minimal region set based on a first property that a region is completely specified by the combination of regions in all subsets of the region. In this example, there is no geographic area indicated by region Seattle 106 that is not also indicated by each region in the subset of region Seattle 106. This first property provides support to specify region sets that are specified in part by selecting a region or regions to exclude. For example, a region set may be specified using a data object that indicates one or more regions that are included in the region set and one or more regions that are excluded from the region set. In this example, the regions excluded from the region set are regions that are included in a subset of an included region. For example, with respect to FIG. 1, if the region set is Lower48, then the region set may be specified by the inclusion of region Lower48 102, and by the exclusion of region "Fremont02" 108(2). In this example, region Fremont02 108(2) is a subset of region WA 104, and region WA 104 is a subset of region Lower48 102. Consequently, region Fremont02 108(2) is included in a subset of region Lower48 102.

Continuing with this example, the region authority 404 may also store, for individual region sets identified by a region set identifier, attribute information associated with the region set. Each business, merchant, or online store computer system, may be associated with one or more region set identifiers and may specify individual attribute information for region sets indexed by each region set identifier. Attributes may include specifications for one or more of: physical products, digital content, services, various shipping options, various legal requirements, various tax impositions, various data collection policies, or other user-specified policies for interacting with users in a region.

Figure 5:
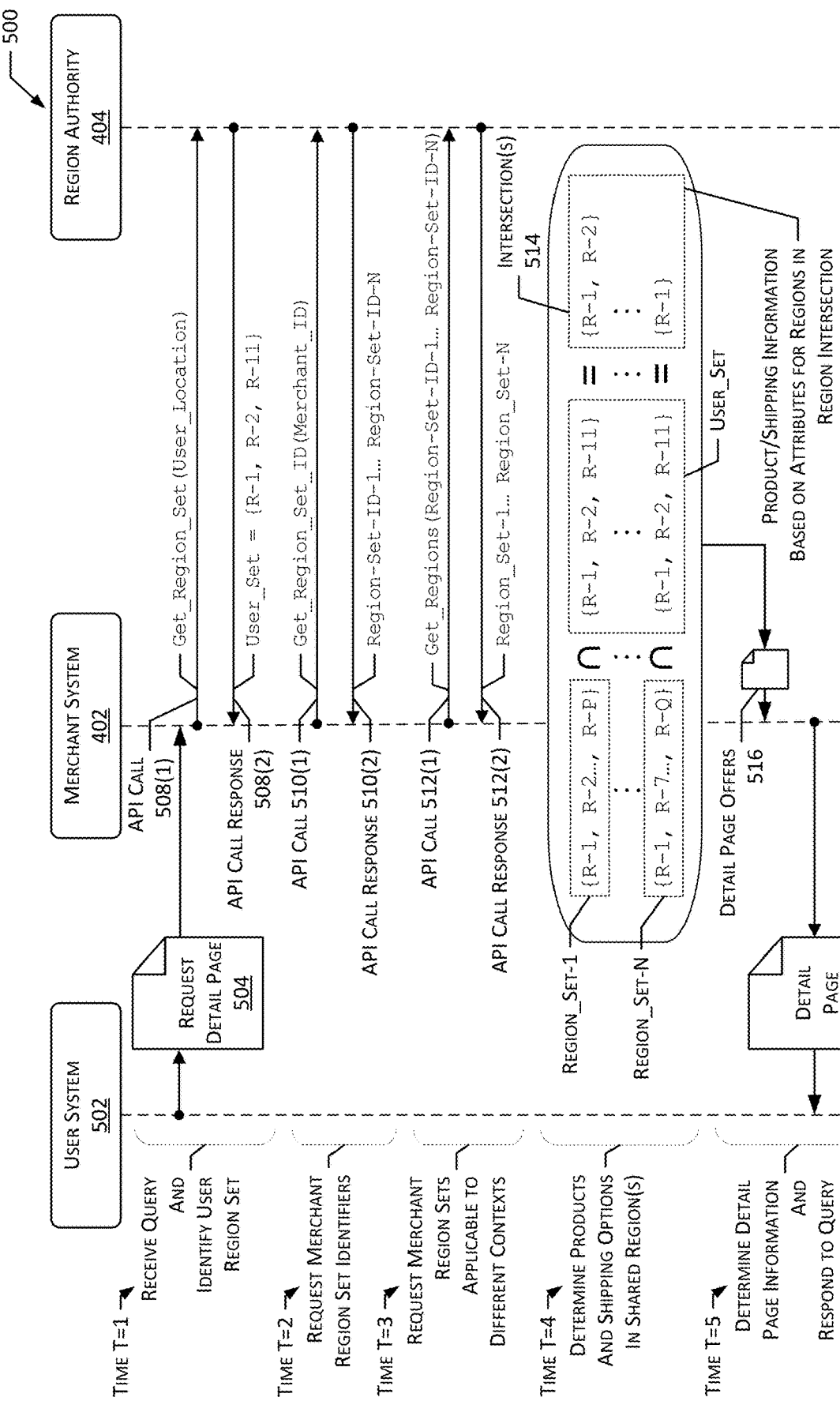
FIG. 5 illustrates a workflow illustrating use of a region authority in an interaction between a user and a merchant, according to some implementations.

FIG. 5 illustrates at 500, a workflow illustrating use of a region authority 404 in an interaction between a user 110 and a merchant 114, according to some implementations.

In this example, a user 110 visits a webpage 180 provided by a merchant 114 to learn about products and services offered by the merchant 114. The merchant system 402 responds by determining location-based customizations using physical location or delivery information associated with the user 110. The location-based customizations are based on attributes associated with various merchant 114 region sets. In particular, the attributes are associated with one or more regions that are common to a region from a region set for the user 110. The region set for the user 110 is determined based on the physical location or delivery information associated with the user 110.

At time t=1, the merchant system 402 may receive a query for a detail page 528 and identify a user region set based on a physical location or on a delivery address associated with a user account. For example, a user 110, using a user system 502, such as a computing device, may use a web browser to visit a website associated with a merchant 114. The user system 502 may, at 504, request a detail page 528 from the merchant system 402. The detail page 528 may be provided by a merchant system 402, such as server 176. To provide a positive user experience, the merchant system 402 should supply a detail page 528 with location-based customizations particular to a physical location associated with the user 110.

In this example, the merchant system 402 may collect information from the user system 502, where the information may be used to determine a physical location associated with the user 110. For example, a user 110 may provide account information, or information to complete a purchase, such as a physical delivery address or payment information. The user system 502 may also use stored data from previous user interactions with the merchant website, where the stored data indicates user account information. The stored data may be a Hypertext Telnet Protocol (HTTP) cookie that a user 110 may have allowed in response to a user prompt for permission to store information associated with the user 110. In other examples, the merchant system 402 may determine a physical location based on an Internet Protocol (IP) address associated with the user system 502.

The merchant system 402 may request a region set associated with the physical location from the region authority 404 by making an API call 508(1). The API call 508(1) may, for example, be "Get_Region_Set(user_location)", or a similar call that provides a physical location associated with the user and requests an associated region set. The region authority 404 may respond with an API call response 508(2) that specifies the user set as {R-1, R-2, R-11}. At time t=2, the merchant system 402 requests region set identifiers associated with the region sets specified by the merchant 114, where region set identifiers are described above with respect to FIG. 4. The merchant system 402 may make an API call 510(1) to the region authority 404 to request region set identifiers associated with the merchant 114. The API call 510(1) may specify a merchant identifier, where a merchant identifier is described above with respect to FIG. 1. The API call 510(1) is depicted as "Get_Region_Set_ID(MerchantID)". The region authority 404 may respond with an API call response 510(2) that indicates the region set identifiers as Region-Set-ID-1-Region-Set-ID-N.

At time t=3, the merchant system 402 may use the region set identifiers to request region sets applicable to different contexts. Contexts, and different goods and services available for different region sets are discussed above with reference to FIG. 4. In this example, the merchant system 402 may make an API call 512(1), depicted as "Get_Regions (Region-Set-ID-1 . . . Region-Set-ID-N)". The region authority 404 may respond with an API call response 512(2) that indicates Region_Set-1 . . . Region_Set-N, which are the different region sets specified by the merchant 114.

At time t=4, the merchant system 402 may determine products and shipping options that are available to the user 110 based on regions that are shared between the user set and the region sets. The merchant system 402, at this point in the example, has a region set associated with the user 110, user set={R-1, R-2, R-11}, and N merchant region sets associated with the merchant 114, Region_Set-1-Region_Set-N. In this example, Region_Set-1={R-1, R-2 . . . R-P} and Region_Set-N={R-1, R-7 . . . R-Q}. To determine detail page offers 516 to include in the detail page 528, the merchant system 402 determines whether any regions in any of the N region sets include regions that are also in the user region set.

The detail page offers 516 indicate products, shipping options, or services that are available to the user 110. To determine the detail page offers 516, the merchant system 402 determines set intersections 514 between the user set and each of the N merchant region sets. For example, the result of a set intersection 514 between Region_Set-1={R-1, R-2 . . . R-P} and user set={R-1, R-2, R-11} is {R-1, R-2}, where the regions not depicted in Region_Set-1 are not in the user set. The result of a set intersection 514 between Region_Set-N={R-1, R-7 . . . R-Q} and user set={R-1, R-2, R-11} is {R-1}, where the regions not depicted in Region_Set-N are not in the user set. For the sake of clarity, only two intersections for two of the region sets for the merchant 114 are depicted. The detail page offers 516 may include all information on region set attributes indicating product options, service options, shipping options, or other options provided by the merchant 114 that are available in the regions resulting from the set intersections 514. In this example, region R-1 is included within a set intersection result using Region_Set-1 and also a set intersection result using Region_Set-N. As described above, attributes are associated with individual region sets, so attributes associated with Region_Set-1 and Region_Set-N are available to the user 110.

At time t=5, the merchant system 402 may use detail page offers 516 to determine location-based customizations in the detail page 528. The merchant system 402 may respond to the request for a detail page at 504 with the detail page 528.

In some examples, to improve computational efficiency, the merchant system 402 may use a process similar to memorization. For example, the merchant system 402 may cache detail page offers 516 and associate them with a region set that includes the regions from the user set, where the detail page offers 516 may indicate service availability associated with the merchant account. The regions in the user set, for example, R-1, which is indicative of a geographic area that includes the physical location associated with the user account, may also include multiple other physical locations associated with multiple other user accounts. In this example, the detail page 528 associated with the merchant 114 may be accessed by a second user associated with a second user account. The second user account may be associated with a delivery address that is within the geographic area indicated by region R-1. In this example, based on the delivery address being within the geographic area, the merchant system 402 may use the cached detail page offers 516 to provide a location-aware version of the detail page 528 to the second user without the merchant system 402 performing the above API calls 508, 510, 512 or the set intersections 514.

In some examples, the computing environment for use of a region authority 404 may include an online store. For example, an online store may provide goods, services, or digital content that are available from multiple different merchants, sellers, businesses, suppliers, or other providers of goods, services, or digital content. In this example, the merchant system 402 may provide an online store. The merchant system 402 may receive a request for a detail page 504 associated with the online store. The merchant system 402 may store region set identifiers for a plurality of merchants providing goods or services through the online store.

Continuing this example, the merchant system 402 may use API call 510(1) to request region set identifiers associated with each individual merchant of the plurality of merchants. The merchant system 402 may perform a set intersection 514 on each region set associated with each of the region set identifiers for the plurality of merchants. Each intersection operation is performed using a region set associated with the user account and a respective one or more region sets for each of the plurality of merchants. The result of the set intersection operations may produce location-based options associated with each of the plurality of merchants.

In this example, the location-based options may be used to provide a location-aware detail page 528 that includes products or services available from the plurality of merchants. In some examples, the merchant system 402 may implement the region authority 404, and in such an example, the functionality provided by the region authority 404 may be performed locally on the merchant system 402 by a locally implemented region authority module 138 and region filtering module 140.

Figure 6:
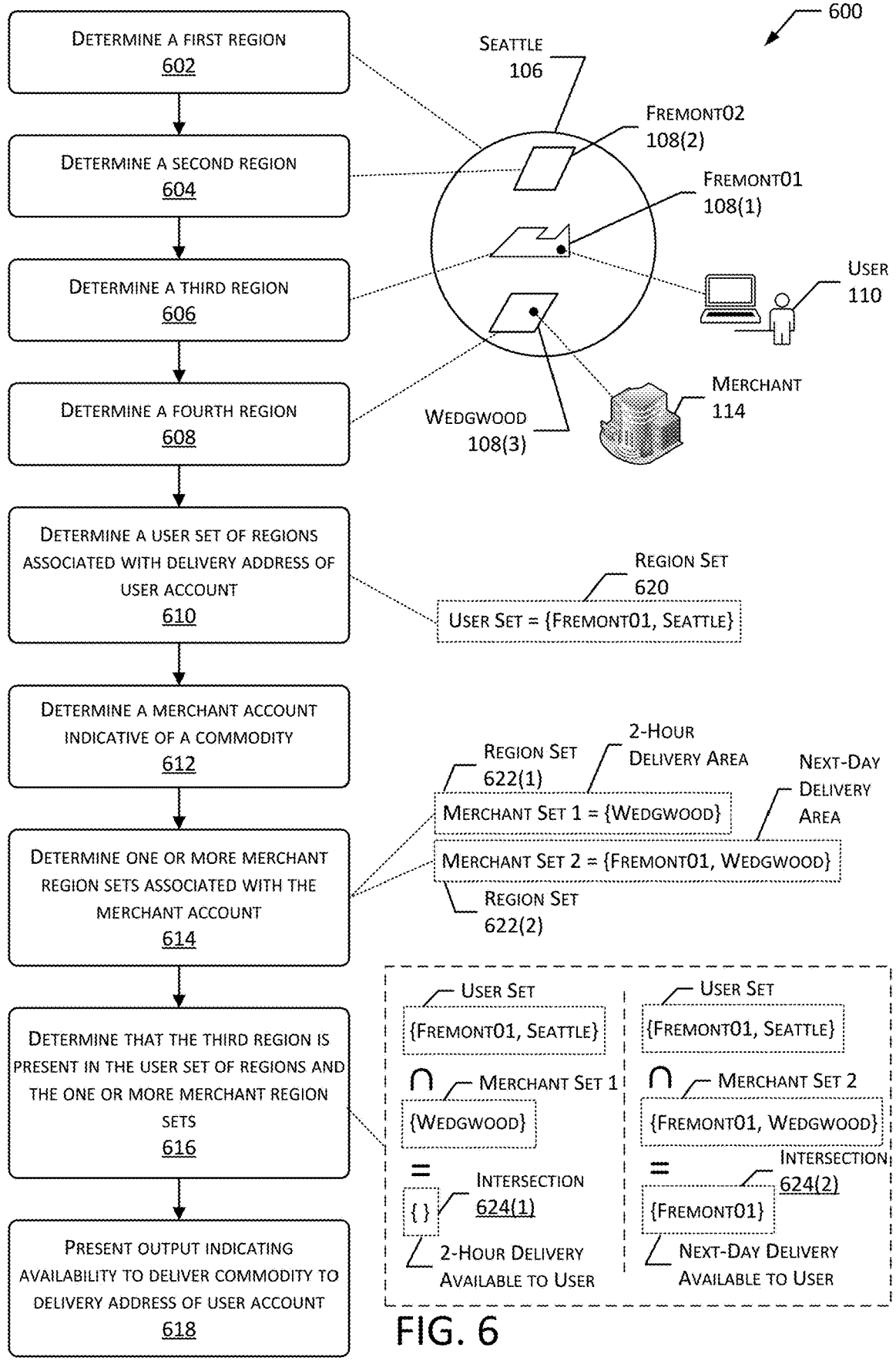
FIG. 6 illustrates a flow diagram of a process for location-based determinations using a common definition of regions, according to some implementations.

FIG. 6 illustrates at 600, a flow diagram of a process for location-based determinations using a common definition of regions, according to some implementations.

At 602, a region filtering module 140 may determine a first region. For example, the region filtering module 140 may determine a first region that is indicative of a first geographic area, where the first region is region Seattle 106. The first region may be customized by selecting a shape and size of the first geographic area indicated by the first region. Customization may be based on coverage areas of one or more merchants 114, delivery times within a geographic area, legal requirements, or other basis described above with respect to FIG. 1.

At 604, the region filtering module 140 may determine a second region. For example, the region filtering module 140 may determine the second region is indicative of a second geographic area within the first geographic area. The second region may be Fremont02 108(2).

At 606, the region filtering module 140 may determine a third region. For example, the region filtering module 140 may determine the third region is indicative of a third geographic area within the first geographic area, and the third geographic area does not overlap with the second geographic area. The third region may be Fremont01 108(1).

At 608, the region filtering module 140 may determine a fourth region. For example, the region filtering module 140 may determine the fourth region is indicative of a fourth geographic area within the first geographic area, and the fourth geographic area does not overlap with either the second geographic area or the third geographic area. The fourth region may be Wedgwood 108(3).

At 610, the region filtering module 140 may determine a first region set 620 associated with a delivery address of a user account. For example, the region filtering module 140 may determine that the first region set 620 includes the third region, Fremont01 108(1). In this example, the third region is indicative of the third geographic area, where the user account for the user 110 indicates the delivery address within the third geographic area. The first region set 620 may be determined as described above with respect to FIG. 5, where an API call 508(1) is used when a physical location is provided to a region authority 404 to request a region set associated with the physical location. In this example, the physical location may be associated with the delivery address of the user account. In this example, the first region set 620 includes the third region and all region sets that include the third region. As discussed above with respect to FIG. 1, for a region set that includes regions where goods or services will be provided, if a merchant 114 provides goods or services to a region in a region set that includes a given region, then the merchant also provides goods or services to the lower regions within a subset of the given region. In this example, the first region set 620 is {Fremont01, Seattle}. In this example, in the interest of simplicity, the highest level region set is region Seattle 106, but in other examples there may be additional, higher level region sets, such as region Lower48 102, or a region indicating the entire USA, or a region indicating a continent, and so on.

At 612, the region filtering module 140 may determine a merchant account indicative of an item. The item may be a first item, and the item may include a physical item, digital content, license, or a service provided by a merchant 114, as described above. The merchant account may be associated with a merchant 114. The indication of the item may be associated with the merchant 114 as described above with respect to FIG. 4. Specifically, the merchant 114 may specify one or more merchant region sets, where individual region sets may be associated with different contexts, different levels of service, different delivery schedules, or different available products. Each of the one or more merchant region sets may be associated with a region set identifier. The merchant 114 may use the region set identifiers to specify attributes associated with a region set. In this example, the merchant 114 may have specified two merchant region sets, region set 622(1), depicted as merchant set 1={Wedgwood} associated with a 2-hour delivery area. The merchant 114 may also have specified region set 622(2), depicted as merchant set 2={Fremont01, Wedgwood} associated with a next-day delivery area.

At 614, the region filtering module 140 may determine the one or more merchant region sets 622 associated with the merchant account. For example, as described above with respect to FIG. 5, the region set identifiers associated with a merchant 114 may be used to determine the region sets associated with the merchant 114. In this example, the one or more merchant region sets 622 include at least a second region set 622(2) associated with the merchant account. The region filtering module 140 may also access attributes associated with each region set. The attributes for each of the one or more merchant region sets 622 may indicate products and shipping options offered by the merchant in each of the region sets 622, including the second region set 622(2). In this example, the merchant 114 may have specified two merchant region sets, region set 622(1), depicted as merchant set 1={Wedgwood} associated with a 2-hour delivery area. The merchant 114 may also have specified region set 622(2), depicted as merchant set 2={Fremont01, Wedgwood} associated with a next-day delivery area.

At 616, the region filtering module 140 may determine that the third region is present in the first region set 620 and the second region set 622(2). For example, the region filtering module 140 may determine that the third region is present in the first region set 620 and the second region set 622(2) at least in part based on a comparison between the first region set 620 and the second region set 622(2). As discussed above with respect to FIG. 1, determining one or more common regions between two region sets may be done using a set intersection 624 operation. In this example, a set intersection 624 is also performed for each of the one or more merchant region sets, including between merchant region set 622(1) and region set 620, depicted as the user set. In this example, the intersection 624(2) between the user set and merchant set 2 includes the third region, Fremont01 108(1), indicating that the delivery address is eligible for next-day delivery for goods or services indicated by the attributes of the region set 622(2). The intersection 624(1) between the user set and merchant set 1 is an empty set, indicating that the delivery address is not eligible for any of the goods or services indicated by the attributes of region set 622(1), including 2-hour delivery.

At 618, the region filtering module 140 may present output indicating availability to deliver the item to the delivery address of the user account. For example, the item may be indicated by the attributes associated with merchant region set 622(2), which may include an indication of delivery schedules. The output may be incorporated into a detail page 528 for a webpage 180 that is customized according the geographic area indicated by the third region, Fremont01 108(1), as described above with respect to FIG. 5.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
determining a first region that is indicative of a first geographic area;
determining a second region that is indicative of a second geographic area within the first geographic area;
determining a third region that is:
indicative of a third geographic area within the first geographic area, and the
third geographic area does not overlap the second geographic area;
determining a fourth region that is:
indicative of a fourth geographic area within the first geographic area, and
the fourth geographic area does not overlap either the second geographic area or the third geographic area;
determining a first region set that is associated with a delivery address of a first user account, wherein the first region set includes the third region;
determining a first merchant account that is indicative of a first item offered;
determining a second region set that is associated with the first merchant account and the first item, wherein the second region set includes the third region and the fourth region;
determining, based on a comparison between the first region set and the second region set, that the third region is present in the first region set and the second region set; and
presenting output indicative of availability to deliver the first item to the delivery address associated with first user account.

2. The method of claim 1, wherein the first region set includes one or more of:
a fifth region that is shaped based on a first merchant within a fifth geographic area providing a delivery time for a product within the fifth geographic area under a first threshold time; and
a sixth region that is shaped irregularly.

3. The method of claim 1, further comprising:
receiving, via an application programming interface (API), a request for the first region set, wherein the request is indicative of a coverage area of product availability for the first merchant account;
determining one or more regions that include the coverage area; and
providing, via the API, a response indicative of the one or more regions.

4. A method comprising:
determining a first region set, wherein individual regions of the first region set are indicative of a respective geographic area;

determining a second region set that is associated with a first account, wherein the second region set is a subset of the first region set;

determining a third region set that is associated with a second account, wherein the third region set is a subset of the first region set;

determining a fourth region set, wherein the fourth region set comprises one or more regions that are present in the second region set and the third region set; and determining, based at least in part on the fourth region set, output data indicative of service availability associated with the second account.

5. The method of claim 4, wherein:

the third region set is one of a plurality of region sets associated with the second account;

individual region sets of the plurality of region sets are associated with one or more of: one or more indications of available products, an indication of a delivery schedule, one or more indications of available services, or one or more indications of merchant promotions; and determining the output data is further based on determining inclusion of a region in the second region set in the plurality of region sets.

6. The method of claim 4, wherein:

the first region set includes an individual region indicative of multiple, non-contiguous geographic areas associated with one or more characteristics;

the one or more characteristics include one or more of:
a type of academic institution,
a type of terrain,
a type of retail establishment,
a type of municipality,
a population size, or
a type of climate;

the first region set includes a fifth region set;

the fifth region set is indicative of a first one or more geographic areas associated with a first municipality;

the first one or more geographic areas are non-overlapping;

the first region set includes a first region; and the first region is indicative of an aggregation of the first one or more geographic areas indicated by the fifth region set.

7. The method of claim 4, wherein the first region set includes one or more of:

a first region indicative of a geographic area that is shaped based on a first merchant within the geographic area providing a delivery time for a physical product within the geographic area under a first threshold time;

a second region indicative of an irregularly shaped geographic area; or a third region indicative of a plurality of geographic areas located at multiple elevations, wherein individual geographic areas of the plurality of geographic areas are associated with individual floors of a building, and wherein the multiple elevations are associated with the individual floors of the building.

8. The method of claim 4, further comprising:

receiving, via an application programming interface (API), a request for the first region set, wherein the request is indicative of a coverage area of availability for an item associated with the second account;

determining one or more regions of the first region set that include the coverage area; and providing, via the API, a response indicative of the one or more regions.

9. The method of claim 4, further comprising:

receiving, via an application programming interface (API), a request for the third region set, wherein the request is indicative of a first set of characteristics specifying a first region of the first region set to include, and wherein the request is indicative of a second set of characteristics specifying a second region of the first region set to exclude;

determining, based on the first set of characteristics and the second set of characteristics, the third region set, wherein the third region set is a subset of the first region set; and providing, via the API, a response indicative of the third region set.

10. The method of claim 4, further comprising:

receiving, via an application programming interface (API), a request for the second region set, wherein the request is indicative of a physical location associated with the first account that is associated with a user;

determining one or more regions of the first region set that include the physical location; and providing, via the API, a response indicative of the one or more regions.

11. The method of claim 4, further comprising:

receiving, via an application programming interface (API), a request for the third region set, wherein the request is indicative of a coverage area of availability of a service associated with the second account, and wherein the second account is associated with a merchant;

determining one or more regions of the first region set that include the coverage area; and providing, via the API, a response indicative of the one or more regions.

12. The method of claim 4, further comprising:

determining that the second region set is indicative of a geographic area that includes a delivery address associated with a third account; and providing, based on the geographic area including the delivery address associated with the third account, the output data indicative of service availability associated with the second account.

13. The method of claim 4, wherein the third region set comprises:

a first region indicative of a first geographic area associated with first restrictions on one or more items associated with the first account, and a second region indicative of a second geographic area associated with second restrictions on the one or more items associated with the first account.

14. A system comprising:

one or more memories storing computer-executable instructions; and one or more processors to execute the computer-executable instructions to:

determine a first region set, wherein individual regions of the first region set are indicative of a respective geographic area;

determine a second region set that is associated with a first account, wherein the second region set is a subset of the first region set;

determine a third region set that is associated with a second account, wherein the third region set is a subset of the first region set;

determine a fourth region set, wherein the fourth region set comprises one or more regions that are present in the second region set and the third region set; and determine, based at least in part on the fourth region set, output data indicative of service availability associated with the second account.

15. The system of claim 14, wherein:
the first region set includes a fifth region set;
the fifth region set is indicative of a first one or more geographic areas associated with a first municipality;
the first one or more geographic areas are non-overlapping;
the first region set includes a first region; and
the first region is indicative of an aggregation of the first one or more geographic areas indicated by the fifth region set.

16. The system of claim 14, wherein the first region set includes one or more of:
a first region indicative of a geographic area that is shaped based on a first merchant within the geographic area providing a delivery time for a physical product within the geographic area under a first threshold time;
a second region indicative of an irregularly shaped geographic area; or
a third region indicative of a plurality of geographic areas located at multiple elevations, wherein individual geographic areas of the plurality of geographic areas are associated with individual floors of a building, and wherein the multiple elevations are associated with the individual floors of the building.

17. The system of claim 14, wherein the one or more processors further execute the computer-executable instructions to:
receive, via an application programming interface (API), a request for the first region set, wherein the request is indicative of a coverage area of availability for an item associated with the second account;
determine one or more regions of the first region set that include the coverage area; and
provide, via the API, a response indicative of the one or more regions.

18. The system of claim 14, wherein the one or more processors further execute the computer-executable instructions to:
receive, via an application programming interface (API), a request for the third region set, wherein the request is indicative of a first set of characteristics specifying a first region of the first region set to include, and wherein the request is indicative of a second set of characteristics specifying a second region of the first region set to exclude;
determine, based on the first set of characteristics and the second set of characteristics, the third region set, wherein the third region set is a subset of the first region set; and
provide, via the API, a response indicative of the third region set.

19. The system of claim 14, wherein the one or more processors further execute the computer-executable instructions to:
receive, via an application programming interface (API), a request for the second region set, wherein the request is indicative of a physical location associated with the first account, and wherein the first account is associated with a user;
determine one or more regions of the first region set that include the physical location; and
provide, via the API, a response indicative of the one or more regions.

20. The system of claim 14, wherein the one or more processors further execute the computer-executable instructions to:
determine that the second region set is indicative of a geographic area that includes a delivery address associated with a third account; and
provide, based on the geographic area including the delivery address associated with the third account, the output data indicative of service availability associated with the second account.

* * * * *